2,961,294

METHOD FOR PRODUCING SODIUM BORATE OF LOWERED IRON CONTENT

Donald S. Taylor, Whittier, and Herbert S. Haber, Anaheim, Calif., assignors to United States Borax & Chemical Corporation, Los Angeles, Calif., a corporation of Nevada No Drawing. Filed Apr. 27, 1959, Ser. No. 808,888

4 Claims. (Cl. 23—59)

The present invention relates as indicated to the production of sodium borates of lowered iron content and has particular reference to a method for reducing the iron content of sodium borate solutions.

Most commercial sodium borates as, for example, sodium tetraborate decahydrate (borax) and sodium tetraborate pentahydrate are produced from ores containing the crude borates combined with a gangue material and small amounts of various other impurities.

The common method for the recovery of the sodium borates is a "wet process" in which the ore is pulverized and is treated with water or a mother liquor containing sodium borate in a dissolving tank. In the wet process the sodium borate is dissolved in the water (or borate solution) leaving the gangue from which it is subsequently separated as by filtration and the sodium borate is then separated from the clarified solution as by crystallization. The sodium borates when put into solution contain on the order of about 100–200 parts per million total iron and when crystallized from solution the finished product usually contains on the order of about 12–30 parts per million of total iron. While for most of the commercial uses of the various sodium borates this small quantity of iron is of no importance, however, there are various requirements for sodium borates wherein it is necessary that the iron content be on the order of 8 parts per million and less.

It is, therefore, the principal object of the present invention to provide a "wet process" method for producing sodium borate having a lowered iron content.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing sodium borate having a lowered iron content which comprises adding to an aqueous solution of sodium borate containing iron as a contaminant, ferric hydroxide, allowing the ferric hydroxide to settle whereby the iron in said sodium borate solution is carried down with said ferric hydroxide, separating the sodium borate solution from said settled ferric hydroxide and crystallizing sodium borate from said solution.

It is of the utmost importance to note that the crux of this invention is in the ferric hydroxide and its method of preparation. We have found that the ferric hydroxide must be prepared in a specific way in order to effectively lower the iron content of sodium borate liquors. In the preparation of the ferric hydroxide to be used in the present invention a strong base is added to a slurry or solution of ferric sulfate. The ferric sulfate cannot be added to a solution of the strong base. If such is done, a ferric hydroxide is produced which will not only fail to remove iron from the sodium borate liquor but will increase the iron content of the same. Furthermore, it is critical to the preparation of the ferric hydroxide that a strong base is used. If a weak base such as sodium carbonate, slaked lime, borax, etc., is used to precipitate the ferric hydroxide, the resultant material will also increase the iron content of the liquor instead of lowering it.

Thus in the preparation of ferric hydroxide for use in the present process the following sequence of steps must be used:

(1) An aqueous slurry of ferric sulfate is first prepared. In the preferred embodiment of our invention we use a slurry containing about 10% $Fe_2(SO_4)_3$ for ease of handling. However, this concentration is not important, the important factor being the quantity of $Fe(OH)_3$ which is ultimately put into the sodium borate liquor.

(2) To this slurry is added a strong base, as for example NaOH, LiOH, KOH, $NH_4OH$, until the slurry reaches a pH of at least 9. Any pH of 9 or higher is applicable to the present preparation.

The resultant precipitate is a flocculent reddish-brown ferric hydroxide, which is insoluble in sodium borate liquors, and which will "scavenge" iron from such liquors.

(3) The ferric hydroxide slurry thus produced is added to the sodium borate liquors in such amounts that the liquors contain from about 0.005% to about 1.0% $Fe(OH)_3$.

In the commercial production of sodium borate, which is a continuous process, the ferric hydroxide slurry is pumped into the sodium borate liquor at about 4–5 gallons per 1100 gallons of borate liquor.

Additionally in the preferred embodiment of our invention we use a freshly precipitated ferric hydroxide slurry since in this manner we are sure that the slurry is substantially free of ferric oxide. However, a previously prepared ferric hydroxide slurry which has not been allowed to dry out and cause formation of ferric oxide will be found to give the desired effect. Also in the preferred embodiment of our invention we use the technique of static settling with the ferric hydroxide. We have found that while the ferric hydroxide slurry, as prepared above, will lower the iron content of a borate liquor while agitation is present, if the liquor is allowed to remain quiescent or in a static condition while the ferric hydroxide is setting the iron removal is more efficient.

Adding a ferric hydroxide slurry, as prepared above, to sodium borate liquors will result in the formation of crystallized sodium borates having an iron content on the order of 8 parts per million and less.

Our present invention is directly applicable to present "wet process" methods for the production of sodium borates. For example, pulverized ore is dissolved in a sodium borate mother liquor and pumped into a settling tank. At this point 1–4 gallons of ferric hydroxide slurry, as prepared above, is added per 1000 gallons of sodium borate liquor and the ferric hydroxide slurry and gangue material are allowed to settle. The liquor is then processed as by filtration and crystallization to produce a finished product having a lowered iron content. It is immaterial to the present invention whether the ferric hydroxide slurry is added to settling tank where the gangue is allow to settle, or whether the ferric hydroxide slurry is added to liquor after the gangue has been removed. In either case, as noted above, it is advantageous to use relatively static settling.

Other modes of applying the principle of the invention may be employed, change being made as regards the details described, provided the features stated in any of the following claims or the equivalent of such be employed.

We, therefore, particularly point out and distinctly claim as our invention:

1. The method of producing sodium borate having a lowered iron content which comprises adding to an aqueous solution of sodium borate containing iron as a contaminant, ferric hydroxide, allowing the ferric hydroxide to settle whereby the iron in said sodium borate solution is carried down with said ferric hydroxide, separating the sodium borate solution from said settled ferric hydroxide and crystallizing sodium borate from said solution.

2. The method of producing sodium borate having a lowered iron content which comprises adding from about 0.005 to about 1.0% of ferric hydroxide as a slurry to an aqueous sodium borate liquor contaminated with iron, allowing the ferric hydroxide to settle whereby iron in said sodium borate solution is carried down with said ferric hydroxide, separating the sodium borate solution from the settled ferric hydroxide and crystallizing the sodium borate from said solution.

3. The method of producing sodium borate having a lowered iron content, which comprises making an aqueous slurry of ferric sulfate, adding a strong base to such ferric sulfate slurry until said slurry reaches a pH of at least 9, adding the resultant ferric hydroxide at amounts of from about 0.005 to about 1.0% to an aqueous solution of sodium borate contaminated with iron, allowing the ferric hydroxide to settle whereby the iron in said sodium borate solution is carried down with said ferric hydroxide, separating the sodium borate solution from said settled ferric hydroxide and crystallizing sodium borate from said solution.

4. The method of claim 3 wherein the strong base is sodium hydroxide.

References Cited in the file of this patent

Ellms: "Water Purification," McGraw-Hill Book Co., 1917, pp. 336–338.

Mellor: "A Comprehensive Treatise on Inorganic and Theoretical Chemistry," vol. 5 (1924), p. 68, and vol. 13 (1934), pp. 859–60.

Sidgwick: "The Chemical Elements and Their Compounds," vol. II (1950), p. 1352.